United States Patent [19]

Peissig

[11] Patent Number: 5,517,786
[45] Date of Patent: May 21, 1996

[54] HEATED FISHING ROD

[76] Inventor: Bruce W. Peissig, 2751 German Rd., Sister Bay, Wis. 54234

[21] Appl. No.: 423,806

[22] Filed: Apr. 18, 1995

[51] Int. Cl.⁶ .................................................. A01K 87/00
[52] U.S. Cl. ................................ 43/18.1; 43/23; 43/24
[58] Field of Search .................................. 43/17.1, 18.1, 43/23; 126/208; 219/204

[56] References Cited

U.S. PATENT DOCUMENTS

| 1,931,303 | 7/1932 | Sturgis | 43/18.1 |
| 3,858,567 | 1/1975 | Slogaski | 126/206 |
| 4,020,835 | 5/1977 | Fusatti | 126/206 |
| 4,598,192 | 7/1986 | Garrett . | |
| 4,646,461 | 3/1987 | McLeod | 43/23 |
| 5,175,953 | 1/1993 | Lesnock . | |
| 5,181,336 | 1/1993 | Yasui | 43/24 |

Primary Examiner—Jack W. Lavinder
Assistant Examiner—Allyson Abrams
Attorney, Agent, or Firm—John D. Gugliotta

[57] ABSTRACT

A fishing rod is provided which consists of a foam handle, plastic cylinder, plastic coated heat tape, rechargeable battery pack, on/off toggle button, electronic regulator, reel holder, metal housed ceramic eyes, and tapered rod shaft. Within the foam handle is a plastic cylinder that houses the battery pack and fixtures for electrical contacts. A plastic butt cap screws onto the ends to seal the opening and secure the battery. Lining the interior of the handle is plastic coated heat tape which also lines the interior of the rod shaft. This tape conducts the heat and, along with the electronic regulator, enables the user to grasp a rod that is not too hot to handle. The rechargeable battery pack is removable and lasts from three to four hours, activated when the fisher pushes the toggle button to the "on" position between the handle and the shaft itself; the reel is fastened to this segment. Metal housed ceramic eyes line the length of the tapered rod shaft with the line strung through each of them. These eyes are evenly heated by the tape which lines the interior or exterior of the shaft. Because the heat is regulated, the line will not be damaged by excessive amounts of heat.

8 Claims, 2 Drawing Sheets

HEATED FISHING ROD

BACKGROUND OF THE INVENTION

1. Field of the Invention

The present invention relates generally to fishing rods, and more particularly, to fishing rods that are heated so as to provide both eyelet de-icing as well as handle warmth.

2. Description of the Related Art

In the related art, many methods of improving fishing rods for use with cold weather or 'ice-fishing' are known. Of these, many methods of heating the handles of fishing rods are also known. These range from wrapping heated and insulated covers external to the handle, to various methods of adding a heat source within the handle. For instance, U.S. Pat. No. 3,858,567, issued in the name of Slogaski, discloses a handle warmer for fishing rods wherein an insulated cover holding a heat source is placed and secured around the handle of a conventional fishing rod in order to provide heat required to maintain the comfort of the user.

The problems associated with the Slogaski reference are similar to the difficulties encountered in other references using similar chemical or combustible heat sources within the fishing rod handle, namely ventilation and overheating. Numerous attempts have been made to correct for these problems. In U.S. Pat. No. 4,646,461, issued in the name of McLeod, a fishing rod with heated handle is disclosed. In the McLeod reference, a series of ventilated openings along the handle provide both combustion air as well as a temperature moderating structure when used with a combustible dry fuel heating source. By providing a cavity within the handle of a fishing rod, an invention made in accordance with the McLeod reference allows heat to be generated by a combustion or chemical reaction without the necessity of a cover-like device such as disclosed in the Slogaski reference.

A similar approach to solving the problems associated with using a combustion or chemical reaction heat source is disclosed in U.S. Pat. No. 4,020,835, issued in the name of Fusetti. In the Fusetti reference, a fishing rod with heated handle is disclosed which utilizes a removable combustion chamber located within the handle which contains the chemical or combustion heating means.

Methods for heating handles without the use of chemical or combustion heating means are also known in the related art. For instance, U.S. Pat. No. 4,598,192 issued in the name of Garret discloses an electrically heated handle for fishing rods. However, a fishing rod made in accordance with this reference is associated with several drawbacks. For example, the electrical voltage source is external to the handle of the invention. Also, a switch means is required to regulate the amount of current in order to manually control the temperature of the handle.

Other problems occur as a result of fishing in cold weather or when ice fishing. When fishing, the eyelet guides can easily pick up water. This water contacting the eyelet guides causes a problem in cold weather, and can freeze quite easily, causing the guides to be obstructed and the line to be impeded. In U.S. Pat. No. 5,175,953 issued in the name of Lesnock, a fishing rod with eyelet de-icing is disclosed. In the Lesnock reference, a heating element associated with at least one of the eyelet guides, particularly the tip eyelet guide, is electrically heated by an electrical power source located within the handle.

Consequently, a need has been felt for providing an apparatus and method which simultaneously overcomes the multiple problems associated with cold weather ice fishing.

SUMMARY OF THE INVENTION

It is therefore the general object of the present invention to provide an improved fishing rod for use with cold weather or ice fishing.

It is a further object of the present invention to provide an improved fishing rod for use with cold weather or ice fishing in which both the handle and the eyelets are heated.

It is a further object of the present invention to provide an improved fishing rod for use with cold weather or ice fishing utilizing an internal electrical heat source.

It is a feature of the present invention to provide an improved fishing rod in which heating means conduct heat in the handle as well as along the rod shaft in order to de-ice the eyelets as well as to provide comfort for the user.

In accordance with a preferred embodiment, a fishing rod is provided which consists of a foam handle, plastic cylinder, plastic coated heat tape, rechargeable battery pack, on/off toggle button, electronic regulator, reel holder, metal housed ceramic eyes, and tapered rod shaft. Within the foam handle is a plastic cylinder that houses the battery pack and fixtures for electrical contacts. A plastic butt cap screws onto the ends to seal the opening and to secure the battery. Lining the interior of the handle is plastic coated heat tape which also lines the interior of the rod shaft. This tape conducts the heat and, along with the electronic regulator, enables the user to grasp a rod that is not too hot to handle. The rechargeable battery pack is removable and lasts from three to four hours, activated when the fisher pushes the toggle button to the "on" position between the handle and the shaft itself; the reel is fastened to this segment. Metal housed ceramic eyes line the length of the tapered rod shaft with the line strung through each of them. These eyes are evenly heated by the tape which lines the interior or exterior of the shaft.

An advantage of the present invention is that because the heat is regulated by the electrical resistance of the heat tape, the line will not be damaged by excessive amounts of heat.

Another advantage of the present invention is that the fishing line will not freeze to the eyelets.

Another advantage of the present invention is that the user's hands will also be heated, eliminating the need for an additional hand warmer.

Another advantage of the present invention is that it functions the same as a standard fishing rod.

Another advantage of the present invention is that rechargeable batteries can be utilized.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

1. Detailed Description of the Figures

Figure 1:
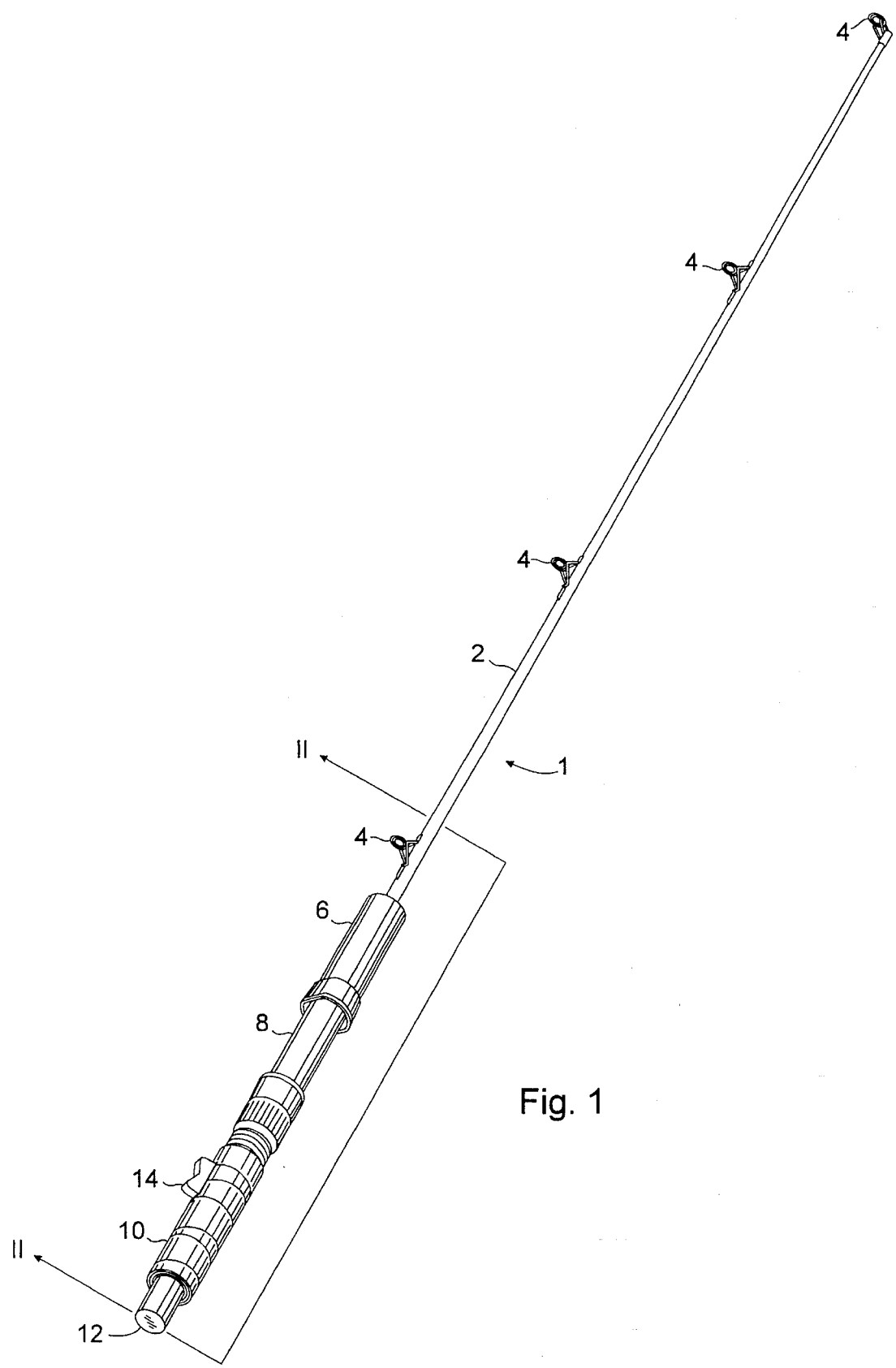
FIG. 1 is an orthographic view of a heated fishing rod according to the preferred embodiment of the present invention.

Referring now to FIG. 1, a fishing rod generally denoted as 1 is depicted, according to the present invention, having a tapered rod shaft 2, a plurality of metal housed ceramic eyelets 4, a foam handle 6, a reel holding section 8, a heated handle section 10, and an end cap 12. The metal housed ceramic eyelets 4 are mounted in a spaced series along the tapered rod shaft 2, and are further described below and in FIG. 2. The heated handle section 10 also contains an on/off toggle switch 14.

Figure 2:
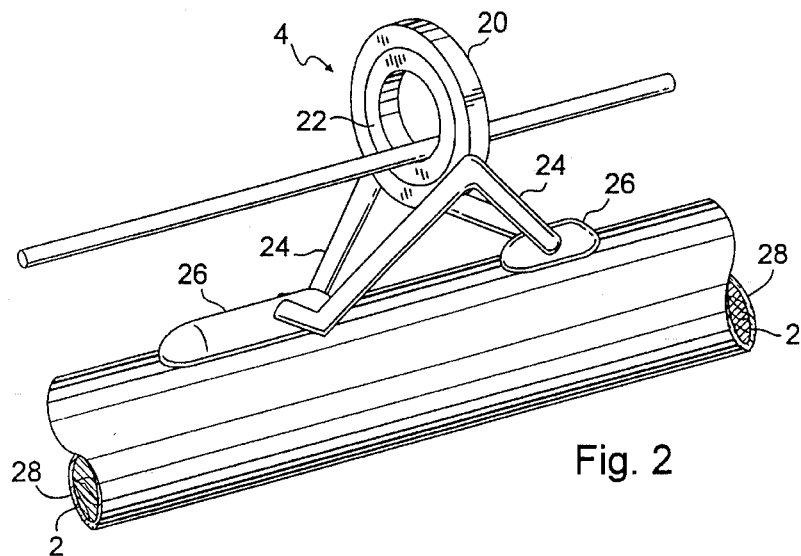
FIG. 2 is a partial exploded orthographic view of an eyelet located on the heated fishing rod according to the preferred embodiment of the present invention.

Referring to FIG. 2, the attachment of the metal housed ceramic eyelets 4 to the tapered rod shaft 2 is shown in greater detail. Each metal housed ceramic eyelet 4 is comprised of a generally annular outer metal ring 20 containing and in thermal contact with an inner ceramic core ring 22. The outer metal ring 20 is attached by a plurality of legs 24. The legs 24 connect the outer metal ring 20 to a pair of feet 26. The feet 26 are in rigid, fixed contact with the tapered rod shaft 2. According to the preferred embodiment of the present invention, rod heating means 28 comprising a plastic coated heat tape is wrapped around and encases the tapered rod shaft 2, as well as being in thermal contact with the feet 26 such that thermal energy can be communicated from the rod shaft 2, through the feet 20, up the legs 24, and to the outer metal ring 20. The ceramic core ring 22 is in thermal contact with the metal ring 20, and as such will conduct the necessary thermal energy to prevent the eyelets 4 from freezing in cold, wet conditions.

Figure 3:
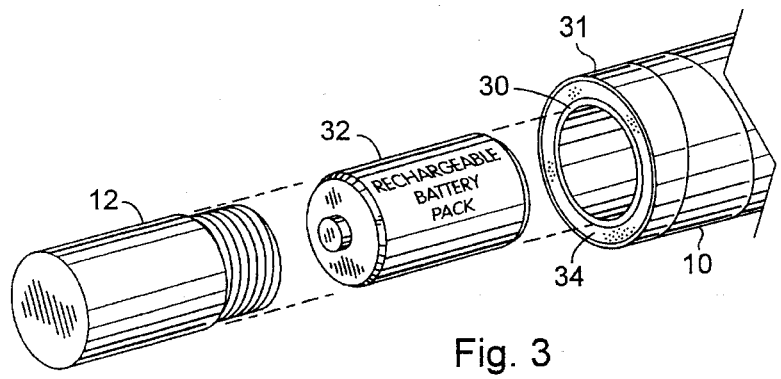
FIG. 3 is an orthographic view of the handle end of a heated fishing rod according to the preferred embodiment of the present invention.

FIG. 3 shows in greater detail the end cap 12 threadingly engaging with the heated handle section 10. The heated handle section 10 is comprised of an inner, hollow cylinder 30, which forms a chamber to house a plurality of rechargeable batteries 32, preferably two. It is currently envisioned that this hollow cylinder 30 is composed of plastic material. In the preferred embodiment of the present invention, the hollow cylinder 30 is surrounded and encased along its outer perimeter with a cushioning means 34, preferably a foam material. The entire outer perimeter of this heated handle section 10 is then wrapped with a handle heating means 31. In its preferred embodiment, this handle heating means 31 is comprised of a plastic coated heating tape, similar in design with that utilized for the rod heating means 28. It is also envisioned that the handle heating means 31 would be in direct electrical contact with and will be simultaneously controlled with the rod heating means 28.

Figure 4:
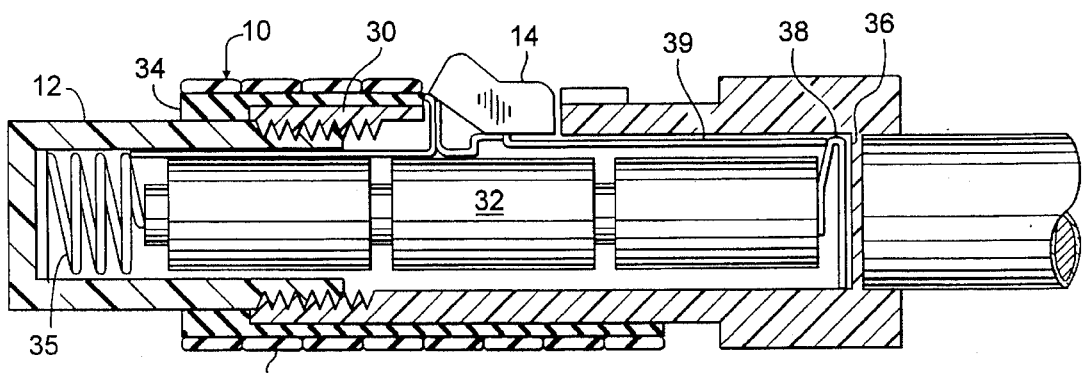
FIG. 4 is a cross sectional view of handle end of the heated fishing rod shown in FIG. 1 taken along lines II—II.

Finally, FIG. 4 depicts in further detail the cross section of the heated handle section 10, showing further: the cap 12 threadingly engaging with the heated handle section 10; the hollow cylinder 30, which forms a chamber to house a sufficient number of rechargeable batteries 32; cushioning means 34 encasing the hollow cylinder 30; and the handle heating means 31 wrapped and surrounding the entire heated handle section 10. Inside the end cap 12 is a positive electrical contact 35. At the interior end of the hollow cylinder 30 is a closed cylinder end 36 supporting a negative electrical contact 38. It is currently envisioned that these electrical contacts 35 and 38 will be of a standard type currently widely utilized in many battery operated devices, such as flashlights, for example. The positive electrical contact 35 and the negative electrical contact 38 are in electrical communication with the toggle switch 14 as well as the batteries 32 and handle heating means 28. An electrical connective means 39 is envisioned in the form of wires or metal bus bars. The toggle switch 14 will close the circuit, causing current to flow from batteries to handle heating means.

2. Operation of the Preferred Embodiment

In operation, the present invention is utilized as would any other fishing rod. Referring generally to the figures, and specifically to FIG. 1, the user would apply a fishing reel of choice to the invention at the reel holder 8. In its preferred embodiment, the present invention would connect to and function with either top mounted reels or spin casting reels which are mounted in a downward position. A user strings fishing line through the eyelets 4, and proceeds as with any other fishing rod. The batteries 32 will be charged and inserted into the heated handle section 10, and the end cap 12 is threaded and engaged thereto, in order to provide for a water-tight seal as well as the required electrical contact between the heating means and the rechargeable batteries 32. The user can then fish as usual. However, during cold weather, or under conditions where icing of the fishing line can occur, the on/off toggle 14 is depressed, thereby causing current from the rechargeable batteries 32 to run into the handle heating means 28 and the rod heating means 31. This will occur when the user requires de-icing of the eyelets, or simply to warm his or her hands. By activating the heating means only when required, battery life is prolonged.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention. Those skilled in the art will understand that changes can be made in the preferred embodiments here described, and that these embodiments can be used for other purposes. Such changes and uses are within the scope of the invention, which is limited only by the claims which follow.

What is claimed is:

1. A heated fishing rod comprising:

a tapered rod shaft;

a plurality of metal housed ceramic eyelets affixed to said shaft in an aligned manner;

an elongated hollow handle, said handle having a first end connected to said rod shaft, and an open end accessing a hollow portion formed within said hollow handle:

a plurality of batteries;

an end cap, fittingly engaged to said opening of said hollow cylindrical portion within said handle such as to provide containment for said plurality of batteries in a water-tight manner;

handle heating means for heating the surface of said handle, wherein said handle heating means comprises a thin, elongated heating tape for converting current from said batteries to heat via electrical resistance, said heating tape being wrapped around said handle such as to provide an increase in surface temperature resulting from said electrical resistance of said heating tape;

eyelet heating means for de-icing said eyelets and said rod shaft, said eyelet heating means being in direct electrical contact with said handle heating means; and switching means for simultaneously engaging and disengaging both said handle heating means and said eyelet heating means.

2. A heated fishing rod comprising:

a tapered rod shaft;

a plurality of metal housed ceramic eyelets affixed to said shaft in an aligned manner;

an elongated hollow handle, said handle having a first end connected to said rod shaft, and an open end accessing a hollow portion formed within said hollow handle;

a plurality of batteries;

an end cap, fittingly engaged to said opening of said hollow cylindrical portion within said handle such as to provide containment for said plurality of batteries in a water-tight manner;

handle heating means for heating the surface of said handle;

eyelet heating means for de-icing said eyelets and said rod shaft, said eyelet heating means being in direct electrical contact with said handle heating means, wherein said eyelet heating means comprises a thin, elongated heating tape for converting current from said batteries to heat via electrical resistance, said heating tape being wrapped around said rod shaft and in thermal contact with said metal housed ceramic eyelets such as to provide an increase in surface temperature of said eyelets resulting from said electrical resistance of said heating tape; and switching means for simultaneously engaging and disengaging both said handle heating means and said eyelet heating means.

3. A fishing rod having a handle, shaft, and fishing line guide eyelets said fishing rod comprising:

handle heating means in heat transfer engagement with the outer surface of said handle for increasing the surface temperature of said handle, wherein said handle heating means comprises an electrically powered thin, elongated, plastic encased resistance heat tape, said resistance heat a tape being wound around said handle in such a fashion as to provide a source of warmth on the surface of said handle;

a plurality of batteries, said batteries contained within said handle and said batteries being in electrical contact with said resistance heat tape such that the current provided from said batteries is converted to heat within said resistance heat tape resulting from the resistance to current flow generated by said resistance heat tape; and eyelet heating means fox de-icing said fishing line guide eyelets during freezing external conditions.

4. A fishing rod having a handle, shaft, and fishing line guide eyelets, comprising:

handle heating means in heat transfer engagement with the outer surface of said handle for increasing the surface temperature of said handle;

eyelet heating means for de-icing said fishing line guide eyelets during freezing external conditions wherein said eyelet heating means comprises an electrically powered thin, elongated, plastic encased resistance heat tape, said resistance heat tape being wound around said shaft and being in thermal contact with said eyelets in such a fashion as to provide a source of warmth on the surface of said eyelets; and a plurality of batteries, said batteries contained within said handle and said batteries being in electrical contact with said resistance heat tape such that the current provided from said batteries is converted to heat within said resistance heat tape resulting from the resistance to current flow generated by said resistance heat tape.

5. A fishing rod having a handle, shaft, and fishing line guide eyelets, comprising:

handle heating means in heat transfer engagement with the outer surface of said handle for increasing the surface temperature of said handle; and eyelet heating means for de-icing said fishing line guide eyelets during freezing external conditions wherein said eyelet heating means and said handle heating means are in direct contact and control with each other such as to operate in unison when engaged by said switching means, and both comprise an electrically powered thin, elongated, plastic encased resistance heat tape, said resistance heat tape being wound around said handle and said shaft and being in thermal contact with said eyelets in such a fashion as to provide a source of warmth on both the surface of said handle as well as the surface of said eyelets.

6. A fishing rod having a handle, shaft, and fishing line guide eyelets, comprising:

handle heating means in heat transfer engagement with the outer surface of said handle for increasing the surface temperature of said handle; and eyelet heating means for de-icing said fishing line guide eyelets during freezing external conditions wherein said eyelet heating means and said handle heating means are in direct contact and control with each other such as to operate in unison when engaged by said switching means, and both comprise a battery powered, thin, elongated, plastic encased resistance heat tape, said resistance heat tape being wound around said handle and said shaft and being in thermal contact with said eyelets in such a fashion as to provide a source of warmth on both the surface of said handle as well as the surface of said eyelets, and said battery power resulting from a plurality of rechargeable batteries, said batteries contained within said handle and said batteries being in electrical contact with said resistance heat tape such that the current provided from said batteries is converted to heat within said resistance heat tape resulting from the resistance to current flow generated by said resistance heat tape.

7. A heated fishing rod with a guiding line, said fishing rod guiding line used for fishing, said heated fishing rod comprising:

an elongated shaft member;

a handle member connected to one end of said shaft member;

a plurality of eyelets for guiding line used for fishing connected with said shaft member, each eyelet of said plurality of eyelets being spaced and aligned along said fishing pole member;

electrical heating element means connected with both said handle member and said plurality of eyelets, wherein said electrical heating element means comprises a thin, elongated, plastic encased resistance heat tape, said resistance heat tape being wound around said handle member and said shaft member and being in thermal contact with said eyelets in such a fashion as to provide a source of warmth on the surface of both said eyelets and said handle member;

electrical power means connected with said handle member for supplying electrical power to said electrical heating element means; and switching means for simultaneously engaging and disengaging both said handle heating means and said eyelet heating means.

8. The fishing rod described in claim 7, wherein said electrical power means comprises at least one battery and wherein said handle member has a cavity therewithin, and wherein said fishing rod further comprises a threaded cap which threadable connects with said handle member to provide access to said cavity of said handle member for said at least one battery to be placed therein.

* * * * *